(12) United States Patent
Ito et al.

(10) Patent No.: US 9,101,914 B2
(45) Date of Patent: Aug. 11, 2015

(54) EXHAUST GAS PURIFYING CATALYST, EXHAUST GAS PURIFYING MONOLITH CATALYST, AND METHOD FOR MANUFACTURING EXHAUST GAS PURIFYING CATALYST

(75) Inventors: Junji Ito, Yokohama (JP); Yasunari Hanaki, Yokohama (JP); Tetsuro Naito, Yokohama (JP); Misaki Akaishi, Yokohama (JP); Hironori Wakamatsu, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/006,841

(22) PCT Filed: Mar. 28, 2012

(86) PCT No.: PCT/JP2012/058122
§ 371 (c)(1),
(2), (4) Date: Sep. 23, 2013

(87) PCT Pub. No.: WO2012/133526
PCT Pub. Date: Oct. 4, 2012

(65) Prior Publication Data
US 2014/0018235 A1  Jan. 16, 2014

(30) Foreign Application Priority Data
Mar. 31, 2011 (JP) .................. 2011-077444

(51) Int. Cl.
*B01J 21/00* (2006.01)
*B01J 23/00* (2006.01)
(Continued)

(52) U.S. Cl.
CPC ........... *B01J 23/8892* (2013.01); *B01D 53/945* (2013.01); *B01J 21/066* (2013.01);
(Continued)

(58) Field of Classification Search
USPC .......................................... 502/303, 100, 300
See application file for complete search history.

(56) References Cited

U.S. PATENT DOCUMENTS 5,089,454 A  2/1992  Lerot et al.
5,243,103 A  9/1993  Lerot et al.
(Continued)

FOREIGN PATENT DOCUMENTS

EP  0 525 677 A1  2/1993
JP  62-221448 A  9/1987
(Continued)

OTHER PUBLICATIONS

Descorme et al. (Applied catalysis A: General 223 (2002) 287-299).*
(Continued)

*Primary Examiner* — James McDonough
(74) *Attorney, Agent, or Firm* — Foley & Lardner LLP

(57) ABSTRACT

An exhaust gas purifying catalyst having a high purifying ability even if noble metal is not used as an essential component, an exhaust gas purifying monolith catalyst, and a method for manufacturing an exhaust gas purifying catalyst, are provided. The exhaust gas purifying catalyst includes an oxide having an oxygen storage and release capacity, and an oxide represented by the following formula (1) supported on the oxide having the oxygen storage and release capacity, $$La_xM_{1-x}M'O_{3-\delta} \tag{1}$$

(wherein La represents lanthanum, M represents at least one element selected from the group consisting of barium (Ba), strontium (Sr) and calcium (Ca), M' represents at least one element selected from the group consisting of iron (Fe), cobalt (Co), nickel (Ni) and manganese (Mn), $\delta$ represents an oxygen deficient amount, and x and $\delta$ fulfill conditions represented by $0<x\leq 1$ and $0\leq\delta\leq 1$, respectively).

11 Claims, 12 Drawing Sheets

(51) Int. Cl.

| | |
|---|---|
| *B01J 25/00* | (2006.01) |
| *B01J 29/00* | (2006.01) |
| *B01J 23/10* | (2006.01) |
| *B01J 23/889* | (2006.01) |
| *B01D 53/94* | (2006.01) |
| *F01N 3/28* | (2006.01) |
| *B01J 23/34* | (2006.01) |
| *B01J 23/83* | (2006.01) |
| *B01J 21/06* | (2006.01) |
| *B01J 37/02* | (2006.01) |
| *B01J 35/00* | (2006.01) |

(52) U.S. Cl.
CPC .............. *B01J 23/002* (2013.01); *B01J 23/10* (2013.01); *B01J 23/34* (2013.01); *B01J 23/83* (2013.01); *B01J 35/006* (2013.01); *B01J 37/0201* (2013.01); *F01N 3/2828* (2013.01); *B01D 2255/204* (2013.01); *B01D 2255/2042* (2013.01); *B01D 2255/2045* (2013.01); *B01D 2255/2063* (2013.01); *B01D 2255/2065* (2013.01); *B01D 2255/2073* (2013.01); *B01D 2255/20715* (2013.01); *B01D 2255/20738* (2013.01); *B01D 2255/20746* (2013.01); *B01D 2255/20753* (2013.01); *B01D 2255/908* (2013.01); *B01D 2255/9202* (2013.01); *B01J 35/002* (2013.01); *B01J 2523/00* (2013.01); *Y02T 10/22* (2013.01)

(56) References Cited

U.S. PATENT DOCUMENTS

| | | | |
|---|---|---|---|
| 2007/0135300 | A1 | 6/2007 | Kagami et al. |
| 2009/0099012 | A1 | 4/2009 | Suzuki et al. |
| 2010/0233045 | A1 | 9/2010 | Kim et al. |
| 2012/0046163 | A1* | 2/2012 | Ifrah et al. ............ 502/241 |
| 2012/0055142 | A1* | 3/2012 | Hilgendorff ............ 60/301 |

FOREIGN PATENT DOCUMENTS

| | | |
|---|---|---|
| JP | 2-17944 A | 1/1990 |
| JP | 05-031367 A | 2/1993 |
| JP | 07-136518 A | 5/1995 |
| JP | 2001-276626 A | 10/2001 |
| JP | 2004-181435 A | 7/2004 |
| JP | 2005-306618 A | 11/2005 |
| JP | 2006-258911 A | 9/2006 |
| JP | 2008-150264 A | 7/2008 |
| JP | 2009-90237 A | 4/2009 |
| JP | 2009-131774 A | 6/2009 |
| JP | 2012-519071 A | 8/2012 |
| WO | WO 02/49963 A1 | 6/2002 |
| WO | WO 2010/100067 A1 | 9/2010 |

OTHER PUBLICATIONS

Japanese Office Action, Jul. 16, 2014, 6 pages.
Chinese Office Action, Jul. 31, 2014, 6 pages.
European Search Report, Sep. 30, 2014, 5 pages.
Japanese Office Action, Oct. 3, 2014, 6 pages.

* cited by examiner

EXHAUST GAS PURIFYING CATALYST, EXHAUST GAS PURIFYING MONOLITH CATALYST, AND METHOD FOR MANUFACTURING EXHAUST GAS PURIFYING CATALYST

TECHNICAL FIELD

The present invention relates to an exhaust gas purifying catalyst, an exhaust gas purifying monolith catalyst, and a method for manufacturing an exhaust gas purifying catalyst, and particularly, relates to an exhaust gas purifying catalyst having an ability to highly purify exhaust gas components, an exhaust gas purifying monolith catalyst, and a method for manufacturing an exhaust gas purifying catalyst.

BACKGROUND ART

Research and development of purifying catalysts not using noble metal as an essential component, are being carried out. There is known an exhaust gas purifying catalyst including a perovskite type composite oxide phase, which includes a rare earth element and a transition metal element and employs a perovskite type composite oxide in which part of the transition metal element is substituted with zirconium (refer to Patent Literature 1).

Further, there are known catalysts, such as a PM oxidation catalyst and an exhaust gas purifying catalyst, having an ability to highly store and release oxygen under low temperature and retain the ability for a long period of time (for example, refer to Patent Literature 2). Such catalysts include a composite oxide that has a perovskite type structure and contains a material with a high oxygen storage and release capacity at low temperature and a material with high oxygen mobility.

CITATION LIST

Patent Literature

Patent Literature 1: Japanese Patent Unexamined Publication No. 2005-306618
Patent Literature 2: Japanese Patent Unexamined Publication No. 2009-131774

SUMMARY OF INVENTION

However, the conventional exhaust gas purifying catalysts as described in Patent Literature 1 and Patent Literature 2 do not have a sufficient exhaust gas purifying ability.

The present invention has been accomplished in view of the conventional problem. An object of the present invention is to provide an exhaust gas purifying catalyst having a high purifying ability even if noble metal is not used as an essential component, an exhaust gas purifying monolith catalyst, and a method for manufacturing an exhaust gas purifying catalyst.

The inventors of the present invention devoted themselves to continuous studies to achieve the object described above. As a result, the inventors accomplished their goals and completed the present invention by supporting the oxide represented by formula (1) on an oxide having an oxygen storage and release capacity.

$$La_xM_{1-x}M'O_{3-\delta} \quad (1)$$

(wherein La represents lanthanum, M represents at least one element selected from the group consisting of barium (Ba), strontium (Sr) and calcium (Ca), M' represents at least one element selected from the group consisting of iron (Fe), cobalt (Co), nickel (Ni) and manganese (Mn), δ represents an oxygen deficiency amount, and x and δ fulfill conditions represented by 0<x≤1 and 0≤δ≤1, respectively.)

Namely, the exhaust gas purifying catalyst according to the present invention includes the oxide having the oxygen storage and release capacity, and the oxide represented by the formula (1) supported on the oxide having the oxygen storage and release capacity.

$$La_xM_{1-x}M'O_{3-\delta} \quad (1)$$

(wherein La represents lanthanum, M represents at least one element selected from the group consisting of barium (Ba), strontium (Sr) and calcium (Ca), M' represents at least one element selected from the group consisting of iron (Fe), cobalt (Co), nickel (Ni) and manganese (Mn), δ represents an oxygen deficiency amount, and x and δ fulfill conditions represented by 0<x≤1 and 0≤δ≤1, respectively.)

An exhaust gas purifying monolithic catalyst according to the present invention includes a catalyst layer that contains the exhaust gas purifying catalyst described above and is formed in an exhaust gas flow path of a monolithic substrate.

A method for manufacturing the exhaust gas purifying catalyst described above according to the present invention includes impregnating the oxide having the oxygen storage and release capacity with a solution containing carboxylic acid lanthanum salt and at least one carboxylic acid metal salt selected from the group consisting of carboxylic acid barium salt, carboxylic acid strontium salt, carboxylic acid calcium salt, carboxylic acid iron salt, carboxylic acid cobalt salt, carboxylic acid nickel salt and carboxylic acid manganese salt, and supporting the carboxylic acid lanthanum salt and the carboxylic acid metal salt on the oxide having the oxygen storage and release capacity in a manner such that the ambient atmosphere of the solution is subjected to reduced pressure lower than atmospheric pressure.

According to the present invention, the oxide represented by the formula (1) is supported on the oxide having the oxygen storage and release capacity.

$$La_xM_{1-x}M'O_{3-\delta} \quad (1)$$

(wherein La represents lanthanum. M represents at least one element selected from the group consisting of barium (Ba), strontium (Sr) and calcium (Ca), M' represents at least one element selected from the group consisting of iron (Fe), cobalt (Co), nickel (Ni) and manganese (Mn), δ represents an oxygen deficiency amount, and x and δ fulfill conditions represented by 0<x≤1 and 0≤δ≤1, respectively.)

Accordingly, the present invention can provide; the exhaust gas purifying catalyst having a high purifying ability even if noble metal is not used as an essential component, the exhaust gas purifying monolith catalyst, and the method for manufacturing the exhaust gas purifying catalyst.

DESCRIPTION OF EMBODIMENTS

Hereinafter, an exhaust gas purifying catalyst, an exhaust gas purifying monolith catalyst, and a method for manufacturing an exhaust gas purifying catalyst will be explained in detail.

[First Embodiment]

Figure 1:
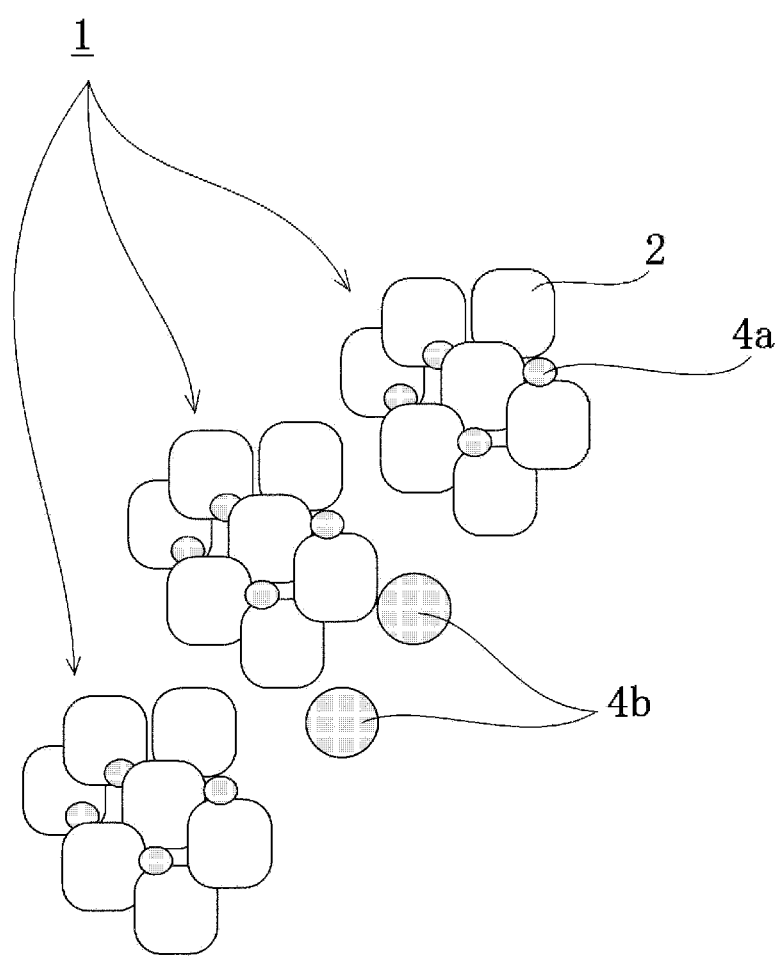
FIG. 1 is a schematic configuration diagram showing an exhaust gas purifying catalyst according to a first embodiment.

First, an exhaust gas purifying catalyst according to an embodiment of the present invention is explained in detail with reference to the drawings. FIG. 1 is a schematic configuration diagram showing an exhaust gas purifying catalyst according to a first embodiment. As shown in the figure, the exhaust gas purifying catalyst 1 according to the first embodiment includes oxides 2 having an oxygen storage and release capacity, and oxides 4a represented by the following formula (1) supported on the oxides 2. A typical particle diameter of the oxides 4a is in the range from 3 nm to 10 nm. Note that for reference, oxides 4b represented by the formula (1) but which are not supported on the oxides 2 having the oxygen storage and release capacity, are also shown in FIG. 1. A typical particle diameter of the oxides 4b is greater than 50 nm.

$$La_xM_{1-x}M'O_{3-\delta} \quad (1)$$

(wherein La represents lanthanum, M represents at least one element selected from the group consisting of barium (Ba), strontium (Sr) and calcium (Ca), M' represents at least one element selected from the group consisting of iron (Fe), cobalt (Co), nickel (Ni) and manganese (Mn), δ represents an oxygen deficiency amount, and x and δ fulfill the conditions represented by 0<x≤1 and 0≤δ≤1, respectively.)

Here, the definition of "the oxides represented by the formula (1) are supported on the oxides having the oxygen storage and release capacity" according to the present invention is explained in detail below with reference to an example in which "oxides B are supported on oxides A."

Aggregated oxides B distinguishable from oxides A, at the point of observing by a transmission electron microscope (TEM), do not correspond to oxides that are supported on the oxides A. On the other hand, aggregated oxides B indistinguishable from the oxides A at the point of observing with TEM, and oxides B from which a constituent element is detected together with a constituent element of the oxides A at the point of elemental analysis of the oxides A by energy dispersive X-ray analysis (EDX (measurement range: beam diameter of 5 nm)), correspond to oxides that are supported on the oxides A. Note that, as a matter of course, the observation of the oxides B with TEM at a higher magnification and by X-ray photoelectron spectroscopy analysis (XPS), is possible.

The above-described configuration contributes to providing an exhaust gas purifying catalyst having a high purifying ability even if noble metal is not used as an essential component.

In the present circumstances, the effect achieved by such an exhaust gas purifying catalyst is probably because of the following reaction mechanism. It should be noted that the case in which the effect is achieved because of any other mechanisms is obviously included within the scope of the present invention.

Figure 2:
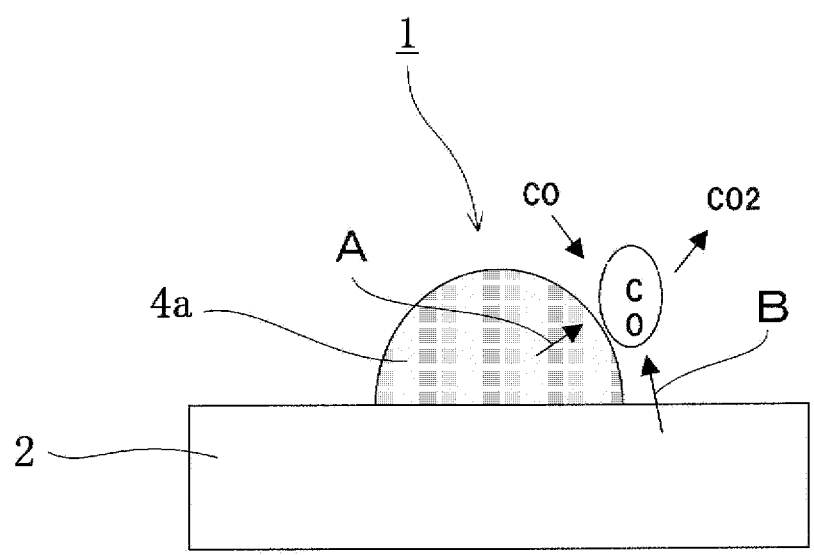
FIG. 2 is an explanatory view of an estimated reaction mechanism.

FIG. 2 is an explanatory view of the estimated reaction mechanism. As shown in the figure, in the exhaust gas purifying catalyst 1, the oxides 4a represented by the formula (1) supported on the oxides 2 having the oxygen storage and release capacity, function as active sites of the catalytic reaction. In this case, the oxides 2 having the oxygen storage and release capacity and supporting the oxides 4a thereon, store and release oxygen required for the catalytic reaction, so as to promote the catalytic reaction. The improvement of the oxygen storage and release capacity further improves purifying activation under low temperature.

Figure 3:
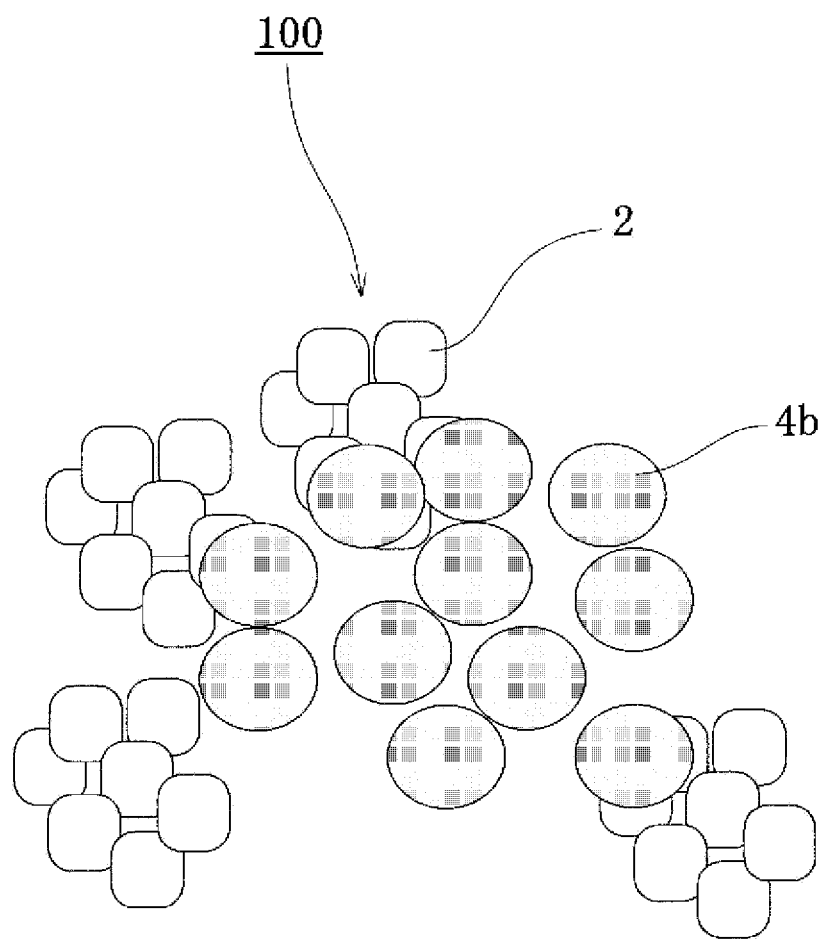
FIG. 3 is a schematic configuration diagram showing a conventional exhaust gas purifying catalyst.

FIG. 3 is a schematic configuration diagram of a conventional exhaust gas purifying catalyst. In the conventional exhaust gas purifying catalyst 10 shown in FIG. 3, the oxides 4b represented by the formula (1) are not supported on the oxides 2 but are present in an aggregated state. The oxides 4b are made of aggregated particles, and the aggregate diameter thereof is typically in the range from 100 nm to 500 nm. This configuration hardly achieves the mechanism described above, and the preferred effect according to the present invention may thus hardly be obtained.

In the exhaust gas purifying catalyst according to the first embodiment, the particle diameter of the oxides having the oxygen storage and release capacity is preferably in the range from 1 nm to 50 nm, more preferably in the range from 5 nm to 20 nm. If the particle diameter of the oxides is less than 1 nm, the oxides having the oxygen storage and release capacity are likely to be aggregated and the preferred effect is not achieved. Further, if the particle diameter of the oxides is greater than 50 nm, the oxides can hardly support the oxides represented by the formula (1) thereon and the preferred effect is not achieved.

In the exhaust gas purifying catalyst according to the first embodiment, the particle diameter of the oxides represented by the formula (1) supported on the oxides having the oxygen storage and release capacity, is preferably in the range from 1 nm to 30 nm, more preferably in the range from 3 nm to 10 nm. If the particle diameter of the oxides is less than 1 nm, the oxides having the oxygen storage and release capacity are likely to be aggregated and the preferred effect is not achieved. Further, if the particle diameter of the oxides is greater than 30 nm, the oxides represented by the formula (1) can hardly be supported and the preferred effect is not achieved. In particular, the particle diameter of the oxides is preferably less than or equal to 10 nm because the oxides can demonstrate a higher purifying ability.

As described above, the oxides represented by the formula (1) can function as active sites of the catalytic reaction, and have more active sites when compared to other oxides of the same amount. Consequently, the particle diameter of the oxides represented by the formula (1) is preferably smaller than the particle diameter of the oxides having the oxygen storage and release capacity.

In the description of the present invention, "the particle diameter" represents the greatest length between any two points on the circumference of the oxide particle (the observed plane) observed by observation means such as a scanning electron microscope (SEM) and TEM. However, the particle diameter is not limited to above ranges, and may of course have any length as long as the effect according to the present invention can be achieved effectively.

In addition, the oxides having the oxygen storage and release capacity in the exhaust gas purifying catalyst according to the first embodiment, are preferably oxides containing at least one of cerium (Ce) and zirconium (Zr), more preferably composite oxides containing both cerium (Ce) and zirconium (Zr). The oxides containing cerium (Ce) are preferable because of their ability to store and release a large amount of oxygen. The oxides containing zirconium (Zr) are preferable because of their ability to store and release oxygen quickly. Thus, the composite oxides containing both cerium (Ce) and zirconium (Zr) are preferable because of their ability to store and release a large amount of oxygen quickly.

Examples of the oxides containing cerium and zirconium include composite oxides containing zirconium, cerium, lanthanum and neodymium (Zr—Ce—La—Nd-Ox), composite oxides containing zirconium, cerium and neodymium (Zr—Ce—Nd-Ox), and composite oxides containing zirconium and lanthanum (Zr—La-Ox). However, the oxides are not limited to these examples. Namely, conventionally known materials may be used as long as the oxides have the oxygen storage and release capacity. For example, the oxides may be oxides containing cerium and zirconium, wherein part of cerium and zirconium is substituted with an alkali metal element, an alkaline-earth metal element or a rare earth element.

Further, when the oxides having the oxygen storage and release capacity in the exhaust gas purifying catalyst according to the first embodiment are the composite oxides containing cerium (Ce) and zirconium (Zr), the content of cerium corresponding to the content of cerium oxide ($CeO_2$) in the composite oxides is preferably greater than or equal to 5% by mass because this contributes to improving the CO conversion ratio. The content is more preferably greater than or equal to 20% by mass because this contributes to further improving the CO conversion ratio. More particularly, the content of cerium corresponding to the content of cerium oxide ($CeO_2$) in the composite oxides is preferably from 5% by mass to 90% by mass inclusive, more preferably from 20% by mass to 80% by mass inclusive. If the content of cerium in the composite oxides is greater than 90% by mass in terms of cerium oxide ($CeO_2$), the effect on the CO conversion ratio may be reduced.

In addition, the oxides represented by the formula (1) in the exhaust gas purifying catalyst are preferably perovskite type oxides because perovskite type oxides have a crystal structure that enhances durability.

[Second Embodiment]

Second, a method for manufacturing an exhaust gas purifying catalyst according to an embodiment of the present invention is explained in detail with reference to the exhaust gas purifying catalyst according to the above-described embodiment. However, the exhaust gas purifying catalyst according to the present invention is not limited to that manufactured by this method.

The exhaust gas purifying catalyst according to the first embodiment may be manufactured by the following method.

First, as for the oxides having the oxygen storage and release capacity, aggregates of fluorite type oxide particles containing cerium and zirconium are prepared.

In addition, a solution is prepared containing carboxylic acid lanthanum salt, and at least one carboxylic acid metal salt selected from the group consisting of carboxylic acid barium salt, carboxylic acid strontium salt, carboxylic acid calcium salt, carboxylic acid iron salt, carboxylic acid cobalt salt, carboxylic acid nickel salt and carboxylic acid manganese salt, and is adjusted in a manner such that the composition of the oxides represented by the formula (1) meets a preferred condition.

Next, the prepared oxides having the oxygen storage and release capacity are impregnated with the solution thus obtained. In this case, the oxides are impregnated with the solution in a manner such that the ambient atmosphere of the solution is subjected to reduced pressure lower than atmospheric pressure. This is achieved by use of, for example, an aspirator, to degas fine pores of the oxides having the oxygen storage and release capacity so as to allow the impregnation and support of the solution to smoothly proceed.

Then, the oxides having the oxygen storage and release capacity, which are impregnated with the carboxylic acid lanthanum salt and the carboxylic acid metal salt and support those thereon, are dried, provisionally baked approximately at 400° C., and then fully baked approximately at 700° C., so as to obtain the exhaust gas purifying catalyst according to the first embodiment.

If, for example, nitrate lanthanum salt and nitrate metal salt are only included, the fine pores of the oxides are easily impregnated therewith because of their little viscosity, but these kinds of salt are easily moved as the solution evaporates at the time of drying and baking, and can hardly be supported on the oxides. On the other hand, when carboxylic acid lanthanum salt and carboxylic acid metal salt are used, the fine pores of the oxides can be impregnated therewith by degassing, since these kinds of salt form a metallic complex salt and have higher viscosity. In addition, such a metallic complex salt is hardly moved in association with the evaporation of the solution, and is supported on the oxides at the time of drying and baking due to its viscous property.

Examples of carboxylic acid include acid having 1 to 4 carboxyl groups. For example, gluconic acid, malic acid, maleic acid, lactic acid, succinic acid, fumaric acid, propionic acid, methacrylic acid, acrylic acid, citric acid, tartaric acid, itaconic acid, formic acid, acetic acid and malonic acid, may be used. Among these, lactic acid is particularly preferable.

[Third Embodiment]

Figure 4:
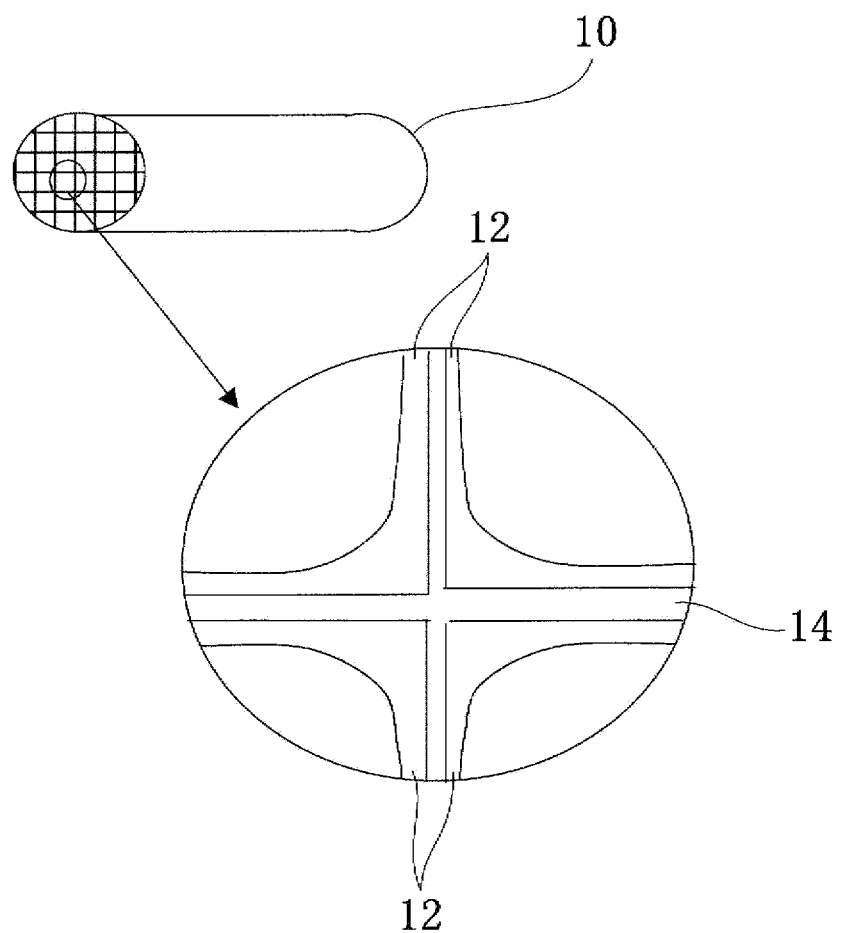
FIG. 4 is a schematic configuration diagram showing an exhaust gas purifying monolithic catalyst according to a third embodiment.

Third, an exhaust gas purifying monolithic catalyst according to an embodiment of the present invention is explained in detail with reference to the drawings. FIG. 4 is a schematic configuration diagram showing an exhaust gas purifying monolithic catalyst according to a third embodiment. The exhaust gas purifying monolithic catalyst 10 according to the third embodiment includes catalyst layers 12 containing the exhaust gas purifying catalyst according to the first embodiment, wherein the catalyst layers 12 are formed in exhaust gas flow paths 14a of a monolithic substrate 14. The monolithic substrate may be a substrate containing a heat-resistant material, which is, for example, a ceramic such as cordierite or a metal such as ferric stainless steel.

The above-described configuration contributes to providing an exhaust gas purifying catalyst having a high purifying ability even if noble metal is not used as an essential component. In particular, such a catalyst can demonstrate a high purifying ability even if the flow of exhaust gas is fast.

EXAMPLES

Hereinafter, the present invention is explained in more detail with reference to examples and a comparative example; however, the present invention is not limited to these examples.

Example 1

A Ce—Z type oxide (72% by mass of $ZrO_2$-21% by mass of $CeO_2$-5% by mass of $Nd_2O_3$-2% by mass of $La_2O_3$) was impregnated with a lactic acid solution containing lanthanum and a lactic acid solution containing iron, and was then kept under reduced pressure for an hour. After that, the oxide was baked in air at 400° C. for two hours and further at 700° C. for five hours, so that an exhaust gas purifying catalyst of this example was obtained. Here, the mass ratio of $LaFeO_3$ to the Ce—Z type oxide is 30 to 70. The particle diameter was observed and measured with a scanning electron microscope (SEM). Table 1 shows a part of the specification of the exhaust gas purifying catalyst of this example.

Figure 5:
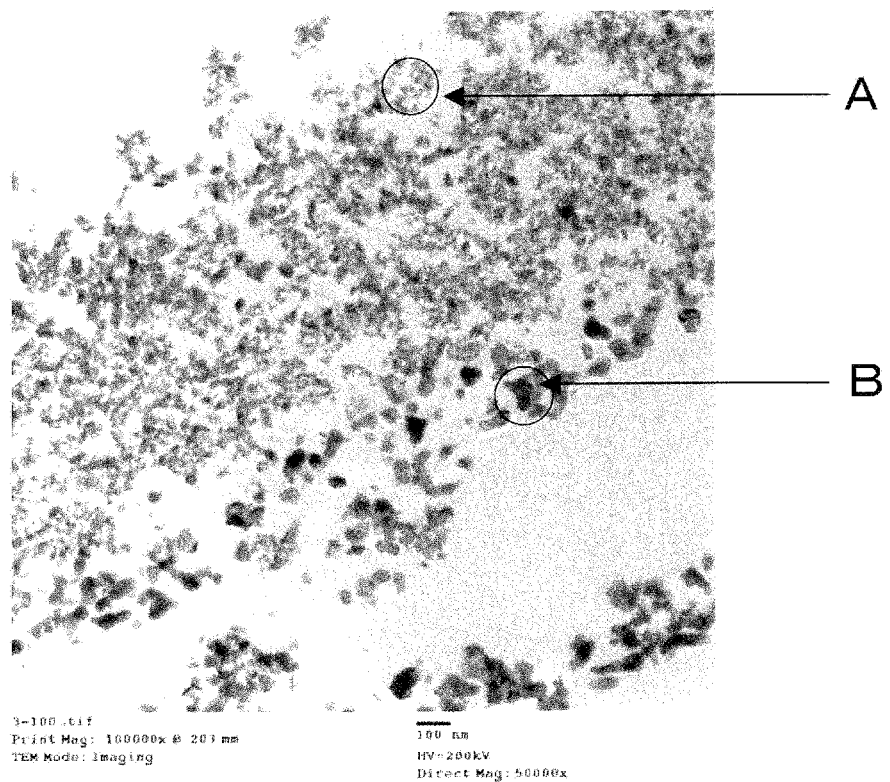
FIG. 5 is a transmission electron micrograph of an exhaust gas purifying catalyst of Example 1.
Figure 6:
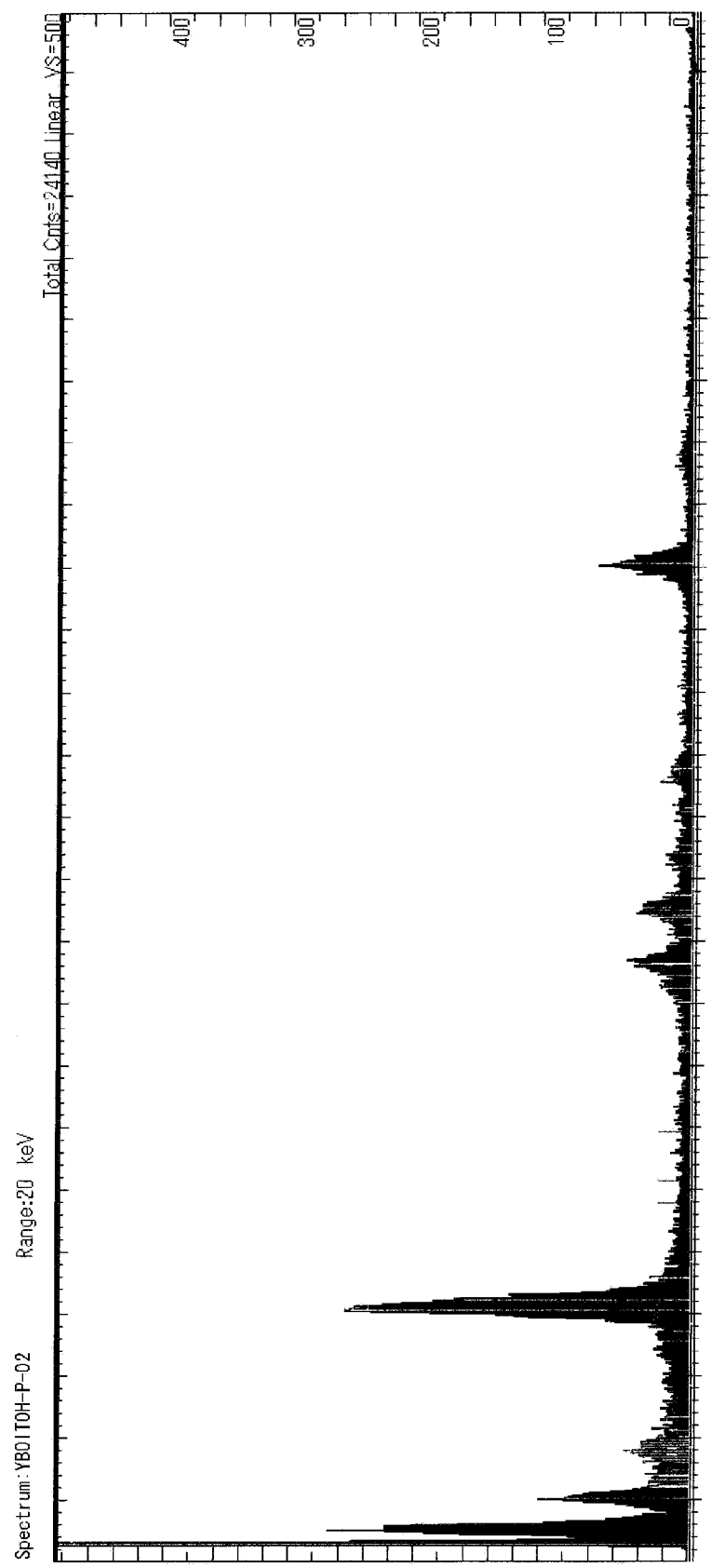
FIG. 6 shows an energy dispersive X-ray analysis of area A shown in FIG. 5.
Figure 7:
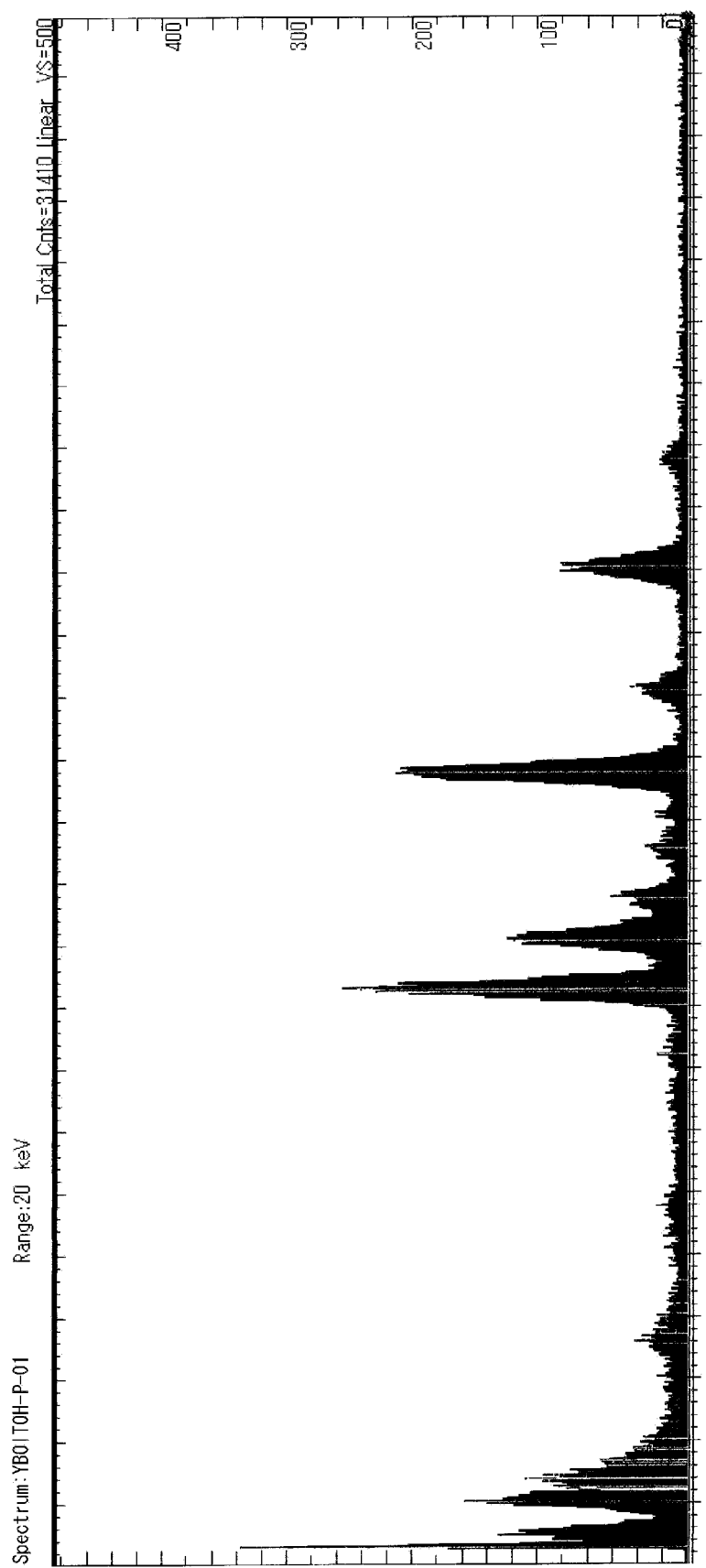
FIG. 7 shows an energy dispersive X-ray analysis of area B shown in FIG. 5.
Figure 8:
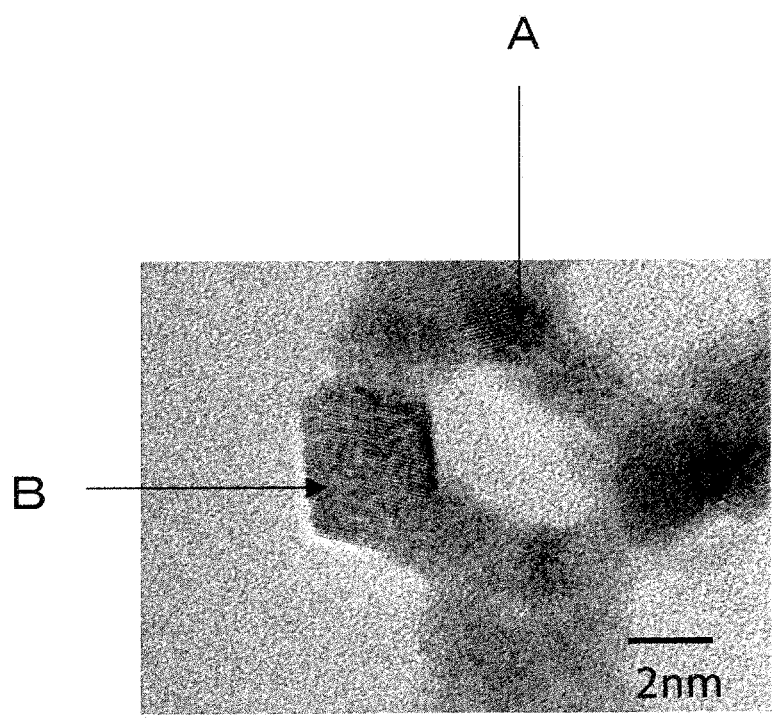
FIG. 8 is a transmission electron micrograph of area A shown in FIG. 5.

FIG. 5 is a photograph of the exhaust gas purifying catalyst of this example taken using a transmission electron microscope (TEM). FIG. 6 shows an energy dispersive X-ray analysis of area A shown in FIG. 5. FIG. 7 shows an energy dispersive X-ray analysis of area B shown in FIG. 5. FIG. 8 is a transmission electron micrograph of area A shown in FIG. 5.

As shown in FIG. 6, in the particles with the diameter of approximately 10 nm observed in area A by energy dispersive X-ray (EDX) elemental analysis, zirconium (Zr) and cerium (Ce) were mainly observed, and lanthanum (La), neodymium (Nd) and iron (Fe) were also observed. In addition, as shown in FIG. 7, in the particles with the diameter of approximately greater than 50 nm observed in area B, iron (Fe) and lanthanum (La) were mainly observed. With regard to the observation in interference fringe areas in FIG. 8, Ce—Z type oxide particles of a fluorite type oxide and $LaFeO_3$ particles of a perovskite type oxide were turned out to be present in interference fringe areas in FIG. 8 owing to additional observation by X-ray photoelectron spectroscopy analysis (XPS). The same observation result was obtained in each example.

Example 2

A Ce—Z type oxide (72% by mass of $ZrO_2$-21% by mass of $CeO_2$-5% by mass of $Nd_2O_3$-2% by mass of $La_2O_3$) was impregnated with a lactic acid solution containing lanthanum and a lactic acid solution containing nickel, and was then kept under reduced pressure for an hour. After that, the oxide was baked in air at 400° C. for two hours and further at 700° C. for five hours, so that an exhaust gas purifying catalyst of this example was obtained. Here, the mass ratio of $LaNiO_3$ to the Ce—Z type oxide is 30 to 70. The particle diameter was observed and measured with the scanning electron microscope (SEM). Table 1 shows a part of the specification of the exhaust gas purifying catalyst of this example.

Example 3

A Ce—Z type oxide (72% by mass of $ZrO_2$-21% by mass of $CeO_2$-5% by mass of $Nd_2O_3$-2% by mass of $La_2O_3$) was impregnated with a lactic acid solution containing lanthanum and a lactic acid solution containing manganese, and was then kept under reduced pressure for an hour. After that, the oxide was baked in air at 400° C. for two hours and further at 700° C. for five hours, so that an exhaust gas purifying catalyst of this example was obtained. Here, the mass ratio of $LaMnO_3$ to the Ce—Z type oxide is 30 to 70. The particle diameter was observed and measured with the scanning electron microscope (SEM). Table 1 shows a part of the specification of the exhaust gas purifying catalyst of this example.

Example 4

A Ce—Z type oxide (70% by mass of $ZrO_2$-20% by mass of $CeO_2$-10% by mass of $Nd_2O_3$) was impregnated with a lactic acid solution containing lanthanum, a lactic acid solution containing strontium and a lactic acid solution containing iron, and was then kept under reduced pressure for an hour. After that, the oxide was baked in air at 400° C. for two hours and further at 700° C. for five hours, so that an exhaust gas purifying catalyst of this example was obtained. Here, the mass ratio of $La_{0.8}Sr_{0.2}FeO_3$ to the Ce—Z type oxide is 30 to 70. The particle diameter was observed and measured with the scanning electron microscope (SEM). Table 1 shows a part of the specification of the exhaust gas purifying catalyst of this example.

Example 5

A Ce—Z type oxide (70% by mass of $ZrO_2$-20% by mass of $CeO_2$-10% by mass of $N_2O_3$) was impregnated with a lactic acid solution containing lanthanum, a lactic acid solution containing iron and a lactic acid solution containing manganese, and was then kept under reduced pressure for an hour. After that, the oxide was baked in air at 400° C. for two hours and further at 700° C. for five hours, so that an exhaust gas purifying catalyst of this example was obtained. Here, the mass ratio of $LaFe_{0.8}Mn_{0.2}O_3$ to the Ce—Z type oxide is 30 to 70. The particle diameter was observed and measured with the scanning electron microscope (SEM). Table 1 shows a part of the specification of the exhaust gas purifying catalyst of this example.

Example 6

A Ce—Z type oxide (70% by mass of $ZrO_2$-20% by mass of $CeO_2$-10% by mass of $Nd_2O_3$) was impregnated with a lactic acid solution containing lanthanum, a lactic acid solution containing iron and a lactic acid solution containing nickel, and was then kept under reduced pressure for an hour. After that, the oxide was baked in air at 400° C. for two hours and further at 700° C. for five hours, so that an exhaust gas purifying catalyst of this example was obtained. Here, the mass ratio of $LaFe_{0.8}Ni_{0.2}O_3$ to the Ce—Z type oxide is 30 to 70. The particle diameter was observed and measured with the scanning electron microscope (SEM). Table 1 shows a part of the specification of the exhaust gas purifying catalyst of this example.

Comparative Example 1

A Ce—Z type oxide (72% by mass of $ZrO_2$-21% by mass of $CeO_2$-5% by mass of $Nd_2O_3$-2% by mass of $La_2O_3$) was impregnated with a nitric acid solution containing lanthanum and a nitric acid solution containing iron, dried at 150° C. overnight, and then pulverized with a mortar. After that, the oxide was baked in air at 400° C. for two hours and further at 700° C. for five hours, so that an oxide of this example was obtained. Here, the mass ratio of $LaFeO_3$ to the Ce—Z type oxide is 30 to 70. The particle diameter was observed and measured with the scanning electron microscope (SEM). The particle diameter of aggregates of the $LaFeO_3$ particles was in the range from 100 nm to 500 nm. Table 1 shows a part of the specification of the exhaust gas purifying catalyst of this example.

Figure 9:
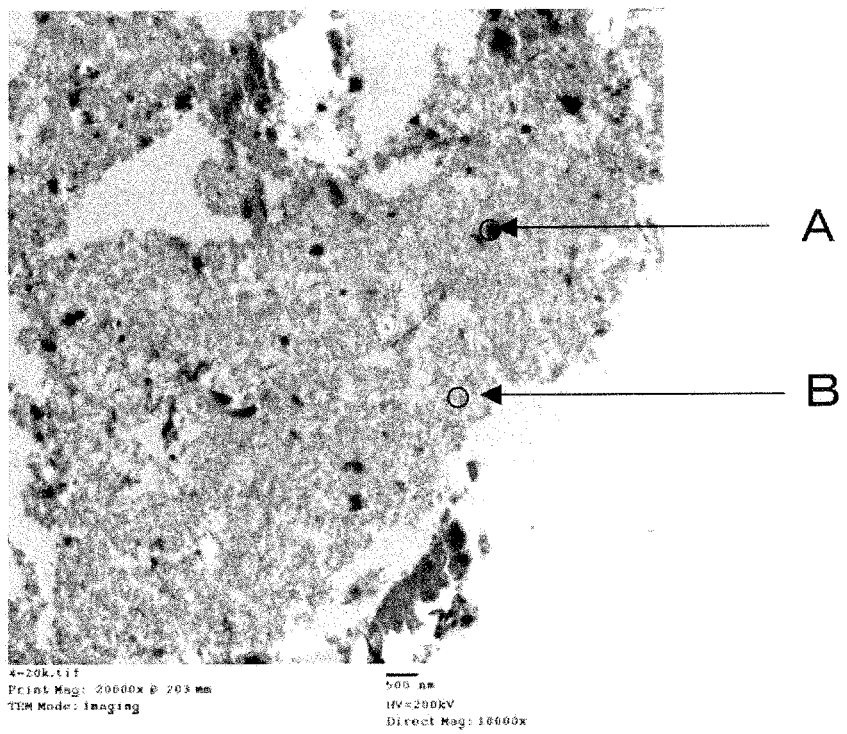
FIG. 9 is a transmission electron micrograph of an exhaust gas purifying catalyst of Comparative Example 1.
Figure 10:
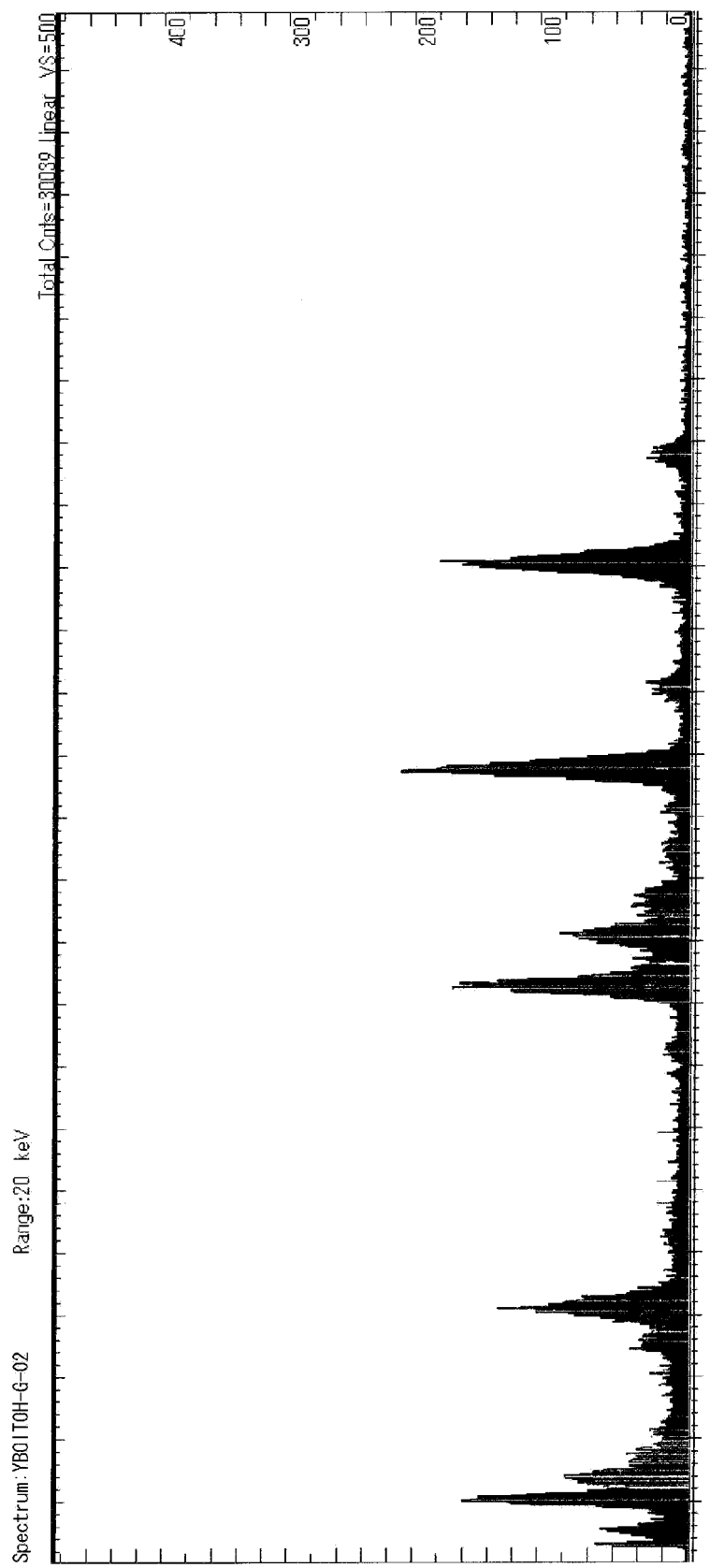
FIG. 10 shows an energy dispersive X-ray analysis of area A shown in FIG. 9.
Figure 11:
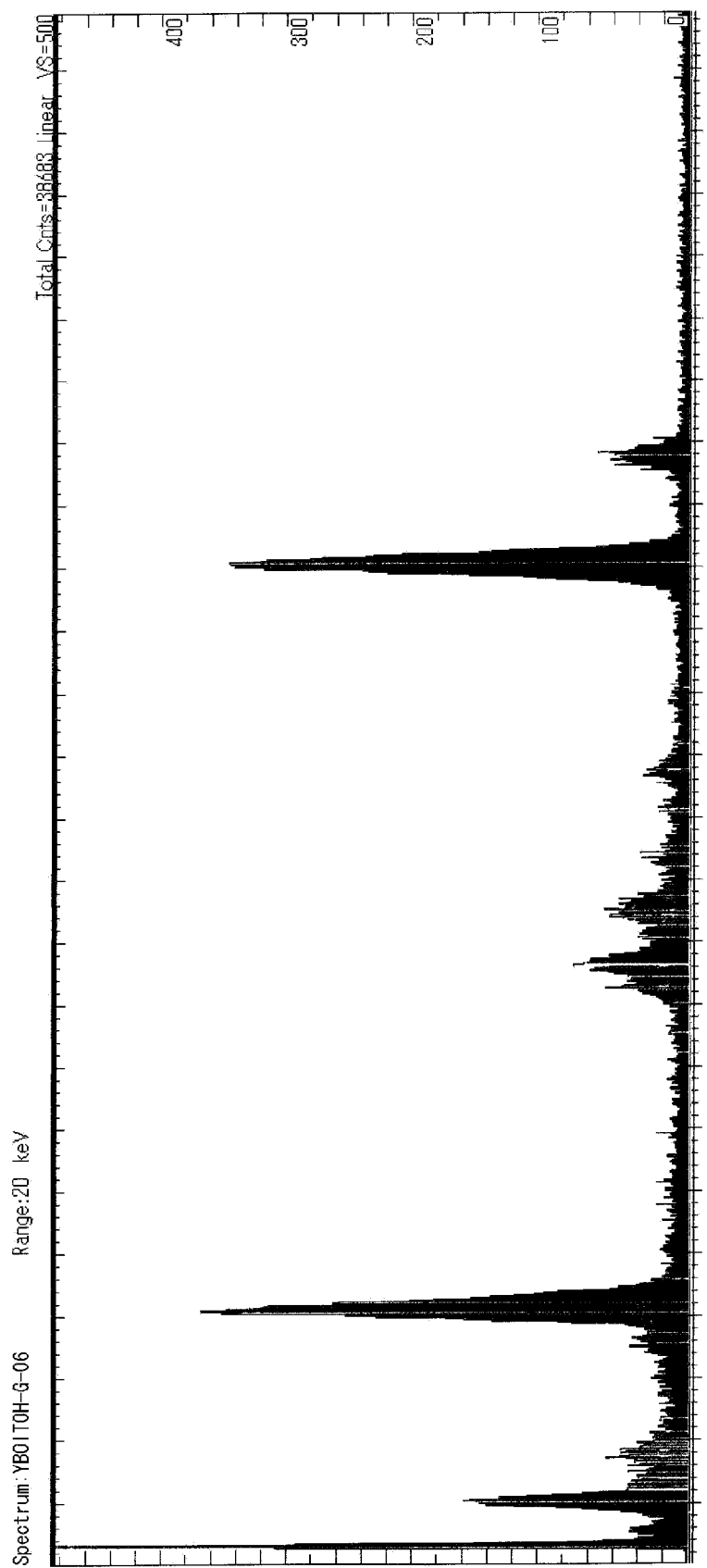
FIG. 11 shows an energy dispersive X-ray analysis of area B shown in FIG. 9.

FIG. 9 is a photograph of the exhaust gas purifying catalyst of this example taken using a transmission electron microscope (TEM). FIG. 10 shows an energy dispersive X-ray analysis of area A shown in FIG. 9. FIG. 11 shows an energy dispersive X-ray analysis of area B shown in FIG. 9.

As shown in FIG. 10, in the aggregates observed in area A by energy dispersive X-ray (EDX) elemental analysis, iron (Fe) and lanthanum (La) were mainly observed. Further, as shown in FIG. 11, in the matrix observed in area B, zirconium (Zr) and cerium (Ce) were mainly observed.

manufactured by HORIBA, LTD.) under the following conditions. The CO conversion ratio was calculated by the following formula (II).

TABLE 1

Unit: nm

Unit: nm

| | Active Site | | | Ce—Zr Type Composite Oxide | | |
|---|---|---|---|---|---|---|
| | Present in Ce—Zr Type Composite Oxide | | | | | |
| | Composition | Particle Diameter (Small) | Particle Diameter (Large) | Composition | Particle Diameter (Small) | Particle Diameter (Large) |
| EXAMPLE 1 | $LaFeO_3$ | 2 | 10 | Ce—Zr—La—Nd—O$x$ | 10 | 30 |
| EXAMPLE 2 | $LaNiO_3$ | 3 | 10 | Ce—Zr—La—Nd—O$x$ | 10 | 30 |
| EXAMPLE 3 | $LaMnO_3$ | 3 | 10 | Ce—Zr—La—Nd—O$x$ | 10 | 30 |
| EXAMPLE 4 | $La_{0.8}Sr_{0.2}FeO_3$ | 5 | 10 | Ce—Zr—Nd—O$x$ | 5 | 30 |
| EXAMPLE 5 | $LaFe_{0.8}Mn_{0.2}O_3$ | 3 | 10 | Ce—Zr—Nd—O$x$ | 5 | 30 |
| EXAMPLE 6 | $LaFe_{0.8}Ni_{0.2}O_3$ | 5 | 10 | Ce—Zr—Nd—O$x$ | 5 | 30 |
| COMPARATIVE EXAMPLE 1 | $LaFeO_3$ | N.D. | N.D. | Ce—Zr—La—Nd—O$x$ | 10 | 30 |

N.D.: Non Detect

[Performance Evaluation]

The purifying performance was evaluated using the exhaust gas purifying catalyst of each example. Table 2 shows the obtained result.

<Powder Evaluation>

The content of $CO_2$ in the exhaust gas purifying catalyst of each example was measured with a quadrupole mass spectrometer under the following conditions. The CO conversion ratio was calculated by the following formula (I).

(Evaluation Condition)
Amount of catalyst: 0.2 g (powder)
Flow rate: 50 cm$^3$/min
Gas composition: 0.4% by volume of CO; 0.2% by volume of $O_2$; balance, He $$\text{CO conversion ratio (\%)} = A \times (CO_{2out}) + B \quad (I)$$

(A calibration curve is preliminarily prepared in a manner such that the value of a mass spectrometer at the mass number of 44 when CO reacts 100%, corresponds to a value at $CO_2$ generation rate that is 100%, and such that the value of the mass spectrometer at the mass number of 44 when CO reacts 0% corresponds to a value at $CO_2$ generation rate that is 0%. The calibration curve is then described as Y=Ax+B, wherein x is the value of the mass spectrometer at the mass number of 44. The character x represents $CO_2$ at the outlet of the catalyst, and is represented by ($CO_{2out}$) in the formula (I).)

<Laboratory Evaluation>

A catalyst slurry was prepared in each example by use of the exhaust gas purifying catalyst of each example, and additionally boehmite alumina, nitric acid and deionized water, so that an exhaust gas purifying monolithic catalyst of each example was obtained. The concentration of CO in the exhaust gas purifying monolithic catalyst of each example was measured with an exhaust gas analyzer (MEXA-7100D, (Evaluation Condition)
Content of catalyst: 119 cm$^3$
Gas flow rate: 40 L/min
Gas composition (stoichiometry): 0.6% by volume of $O_2$; 0.6% by volume of CO; 1000 volume ppm of NO; 1665 volume ppmC of HC; 0.2% by volume of $H_2$; 10% by volume of $H_2O$; 13.9% by volume of $CO_2$ $$\text{CO conversion ratio (\%)} = (CO_{in} - CO_{out})/CO_{in} \times 100 \quad (II)$$

(wherein $CO_{in}$ represents the concentration of CO in the gas in the exhaust gas analyzer before passing through the sample, and $CO_{out}$ represents the concentration of CO in the gas in the exhaust gas analyzer after passing through the sample.)

<Bench Test Evaluation>

A catalyst slurry was prepared in each example by use of the exhaust gas purifying catalyst of each example, and additionally boehmite alumina, nitric acid and deionized water, so that an exhaust gas purifying monolithic catalyst of each example was obtained. The concentration of CO in the exhaust gas purifying monolithic catalyst of each example was measured with an exhaust gas analyzer (MEXA-7500D, manufactured by HORIBA, LTD.) under the following conditions. The CO conversion ratio was calculated by the formula (II).

(Evaluation Condition)
Use of engine manufactured by NISSAN MOTOR CO., LTD.
Content of catalyst: 119 cm$^3$
Gas flow rate: 60 m$^3$/h
Gas composition (stoichiometry): approximately 2000 volume ppmC of HC; approximately 0.54% by volume of CO; approximately 1500 volume ppm of NO; approximately 0.56% by volume of $O_2$; 14.6% by volume of $CO_2$

TABLE 2

| | Powder Evaluation CO Conversion Ratio (%) (Catalyst Inlet Temperature: 350° C.) | Laboratory Evaluation CO Conversion Ratio (%) (Catalyst Inlet Temperature: 480° C.) | Bench Test Evaluation CO Conversion Ratio (%) (Catalyst Inlet Temperature: 480° C.) |
|---|---|---|---|
| EXAMPLE 1 | 61 | 31 | 45 |
| EXAMPLE 2 | — | 20 | — |
| EXAMPLE 3 | — | 25 | — |
| EXAMPLE 4 | — | 80 | 88 |
| EXAMPLE 5 | — | 25 | 36 |
| EXAMPLE 6 | — | 21 | 31 |
| COMPARATIVE EXAMPLE 1 | 47 | 15 | — |

As is apparent from Table 1 and Table 2, evaluation revealed that Examples 1 to 6 relating to the scope of the present invention have a higher conversion ratio of carbon monoxide and demonstrate higher oxidation performance than Comparative Example 1 excluded in the present invention. In particular, Example 1 and Example 4 provably have superior characteristics in the present circumstances.

<Bench Test Evaluation 2>

Figure 12:
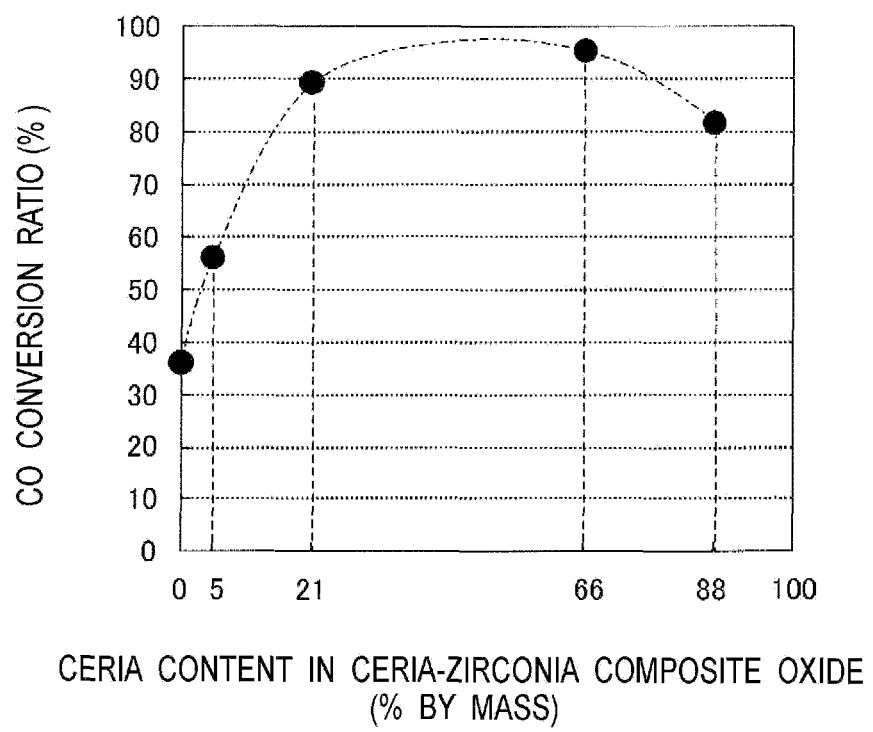
FIG. 12 is a graph showing a relationship between CO conversion ratio and the amount of ceria in a ceria-zirconia composite oxide.

A catalyst slurry was prepared for each sample by use of a ceria-zirconia composite oxide, instead of the Ce—Z type oxide of Example 4, in a manner as to vary the amount of ceria thereof, and additionally by use of boehmite alumina, nitric acid and deionized water. With the catalyst slurries having the different amounts of ceria, an exhaust gas purifying monolithic catalyst of each sample was obtained. The concentration of CO in the exhaust gas purifying monolithic catalyst of each sample was measured with an exhaust gas analyzer (MEXA-9100, manufactured by HORIBA, LTD.) under the following conditions. The CO conversion ratio was calculated by the formula (II). FIG. 12 shows the obtained result.

(Evaluation Condition)

Use of engine manufactured by NISSAN MOTOR CO., LTD.
Coating amount of catalyst: 268 g/L +Alumina: 32 g/L
Gas flow rate: 60 m³/h
A/F amplitude: ±0.2, 1.0 Hz
Gas composition (stoichiometry): approximately 2000 volume ppmC of HC; approximately 0.54% by volume of CO; approximately 1500 volume ppm of NO; approximately 0.56% by volume of $O_2$; 14.6% by volume of $CO_2$ As is apparent from FIG. 12, evaluation revealed that the amount of ceria ($CeO_2$) in the ceria-zirconia composite oxide is preferably greater than or equal to 5% by mass, more preferably greater than or equal to 20% by mass, still more preferably in the range from 5% to 90% by mass, particularly preferably in the range from 20% to 80% by mass.

REFERENCE SIGNS LIST 1, 100 Exhaust gas purifying catalyst
2 Oxide having oxygen storage and release capacity
4a, 4b Oxide represented by formula (1)
10 Exhaust gas purifying monolithic catalyst
12 Catalyst layer
14 Monolithic substrate

The invention claimed is:

1. An exhaust gas purifying catalyst, comprising:
    an oxide having an oxygen storage and release capacity; and
    an oxide represented by formula (1) supported on the oxide having the oxygen storage and release capacity, $$La_xM_{1-x}M'O_{3-\delta} \quad (1)$$

(wherein La represents lanthanum, M represents at least one element selected from the group consisting of barium (Ba), strontium (Sr) and calcium (Ca), M' represents at least one element selected from the group consisting of iron (Fe), cobalt (Co), nickel (Ni) and manganese (Mn), δ represents an oxygen deficiency amount, and x and δ fulfill conditions represented by $0<x\leq1$ and $0\leq\delta\leq1$, respectively),
    wherein a particle diameter of the oxide having the oxygen storage and release capacity is in a range from 1 nm to 50 nm,
    a particle diameter of the oxide represented by the formula (1) is in a range from 1 nm to 30 nm,
    the exhaust gas purifying catalyst does not include a noble metal, and
    the particle diameter of the oxide represented by the formula (1) is smaller than the particle diameter of the oxide having the oxygen storage and release capacity.

2. The exhaust gas purifying catalyst according to claim 1, wherein the particle diameter of the oxide having the oxygen storage and release capacity is in the range from 5 nm to 20 nm, and
    the particle diameter of the oxide represented by the formula (1) is in the range from 3 nm to 10 nm.

3. The exhaust gas purifying catalyst according to claim 1, wherein the oxide having the oxygen storage and release capacity is an oxide containing at least one of cerium and zirconium.

4. The exhaust gas purifying catalyst according to claim 1, wherein the oxide having the oxygen storage and release capacity is a composite oxide containing cerium and zirconium.

5. The exhaust gas purifying catalyst according to claim 4, wherein a content of cerium corresponding to a content of cerium oxide ($CeO_2$) in the composite oxide is greater than or equal to 5% by mass.

6. The exhaust gas purifying catalyst according to claim 4, wherein a content of cerium corresponding to a content of cerium oxide ($CeO_2$) in the composite oxide is greater than or equal to 20% by mass.

7. An exhaust gas purifying monolithic catalyst, comprising:
    a catalytic layer containing the exhaust gas purifying catalyst according to claim 1; and
    a monolithic substrate,
    the catalytic layer being formed in an exhaust gas flow path of the monolithic substrate.

8. A method for manufacturing the exhaust gas purifying catalyst according to claim 1, comprising:
    impregnating the oxide having the oxygen storage and release capacity with a solution containing carboxylic acid lanthanum salt and at least one carboxylic acid metal salt selected from the group consisting of carboxylic acid barium salt, carboxylic acid strontium salt, carboxylic acid calcium salt, carboxylic acid iron salt, carboxylic acid cobalt salt, carboxylic acid nickel salt and carboxylic acid manganese salt; and supporting the carboxylic acid lanthanum salt and the carboxylic acid metal salt on the oxide having the oxygen storage and release capacity in a manner such that an ambient atmosphere of the solution is subjected to reduced pressure lower than atmospheric pressure.

9. The exhaust gas purifying catalyst according to claim 1, wherein the oxide having the oxygen storage and release capacity is a composite oxide containing zirconium, cerium, lanthanum and neodymium or a composite oxide containing zirconium, cerium and neodymium.

10. The exhaust gas purifying catalyst according to claim 1, wherein the oxide represented by the formula (1) is at least one selected from $LaNiO_3$, $LaMnO_3$, $La_{0.8}Sr_{0.2}FeO_3$, $LaFe_{0.8}Mn_{0.2}O_3$ and $LaFe_{0.8}Ni_{0.2}O_3$.

11. The exhaust gas purifying catalyst according to claim 1, wherein the oxide represented by formula (1) is $LaNiO_3$ or $LaMnO_3$.

* * * * *